United States Patent
Henson et al.

(10) Patent No.: US 7,953,991 B2
(45) Date of Patent: May 31, 2011

(54) PROCESSING SYSTEM AND METHODS FOR USE THEREWITH

(75) Inventors: Matthew Brady Henson, Austin, TX (US); Daniel Mulligan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1316 days.

(21) Appl. No.: 11/507,378

(22) Filed: Aug. 21, 2006

(65) Prior Publication Data

US 2007/0204175 A1    Aug. 30, 2007

Related U.S. Application Data

(60) Provisional application No. 60/777,039, filed on Feb. 27, 2006.

(51) Int. Cl.
*G06F 1/00* (2006.01)
(52) U.S. Cl. ....................................... 713/300
(58) Field of Classification Search .................. 713/300
See application file for complete search history.

(56) References Cited

U.S. PATENT DOCUMENTS

| | | | |
|---|---|---|---|
| 5,440,520 A * | 8/1995 | Schutz et al. | 365/226 |
| 6,047,248 A * | 4/2000 | Georgiou et al. | 702/132 |
| 6,119,241 A * | 9/2000 | Michail et al. | 713/322 |
| 6,933,869 B1 * | 8/2005 | Starr et al. | 341/120 |
| 7,493,229 B2 * | 2/2009 | Boerstler et al. | 702/132 |
| 2002/0029121 A1 * | 3/2002 | Bausch et al. | 702/107 |
| 2005/0141311 A1 * | 6/2005 | Kim et al. | 365/222 |
| 2005/0218871 A1 * | 10/2005 | Kang et al. | 323/265 |
| 2006/0002217 A1 * | 1/2006 | Walker et al. | 365/211 |
| 2006/0262591 A1 * | 11/2006 | Ambroggi | 365/129 |
| 2007/0045825 A1 * | 3/2007 | Chan et al. | 257/723 |
| 2007/0174642 A1 * | 7/2007 | Cornwell et al. | 713/300 |

* cited by examiner

*Primary Examiner* — Thomas Lee
*Assistant Examiner* — Brandon Kinsey
(74) *Attorney, Agent, or Firm* — Ingrassia Fisher & Lorenz, P.C.

(57) ABSTRACT

A processing system includes a processing module and a memory module for storing plurality of data. A controllable power source supplies a source voltage to the memory module in response to a target voltage. A controller module receives a temperature signal and adjusts the target voltage in response to the temperature signal.

24 Claims, 15 Drawing Sheets

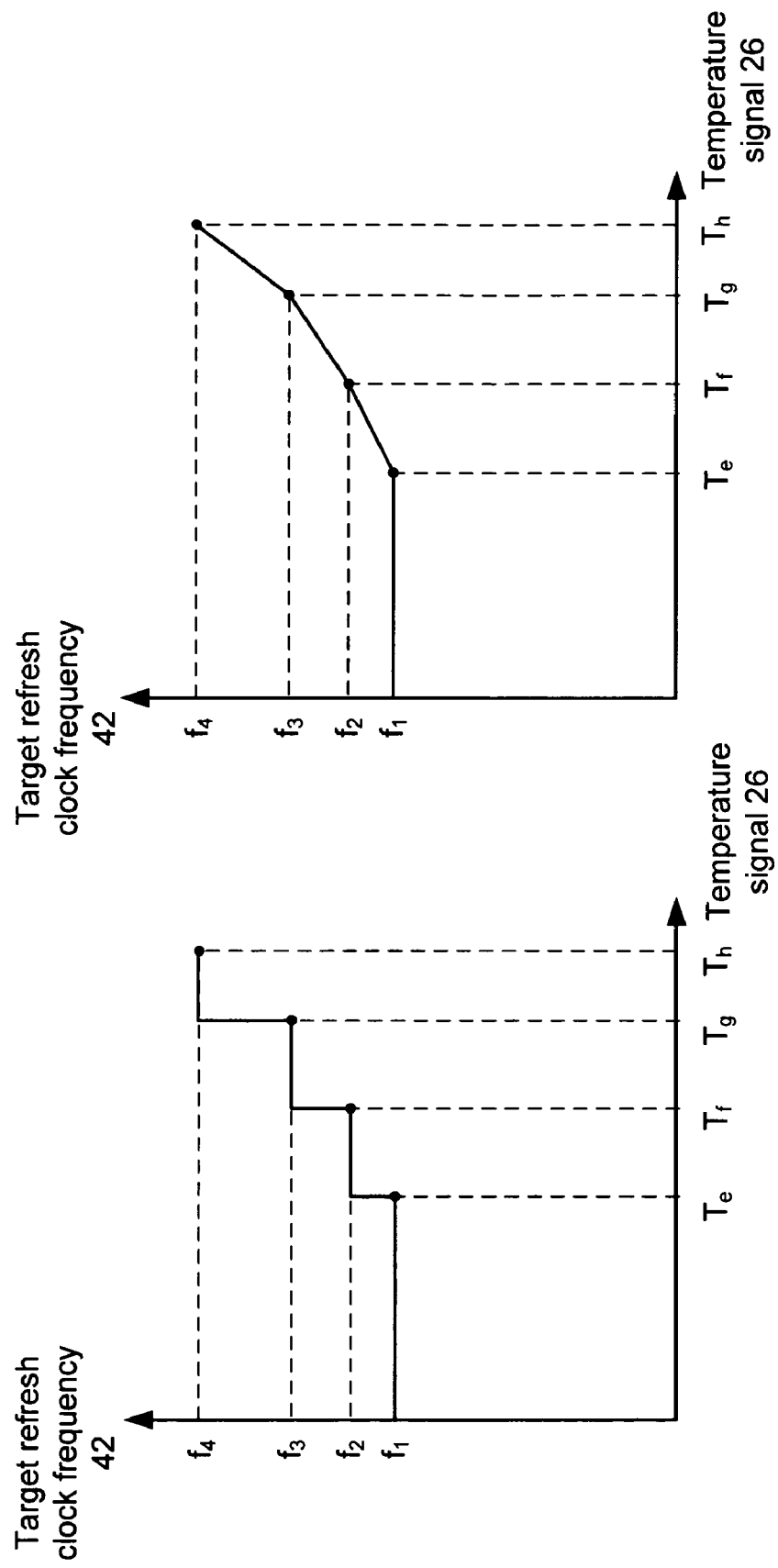

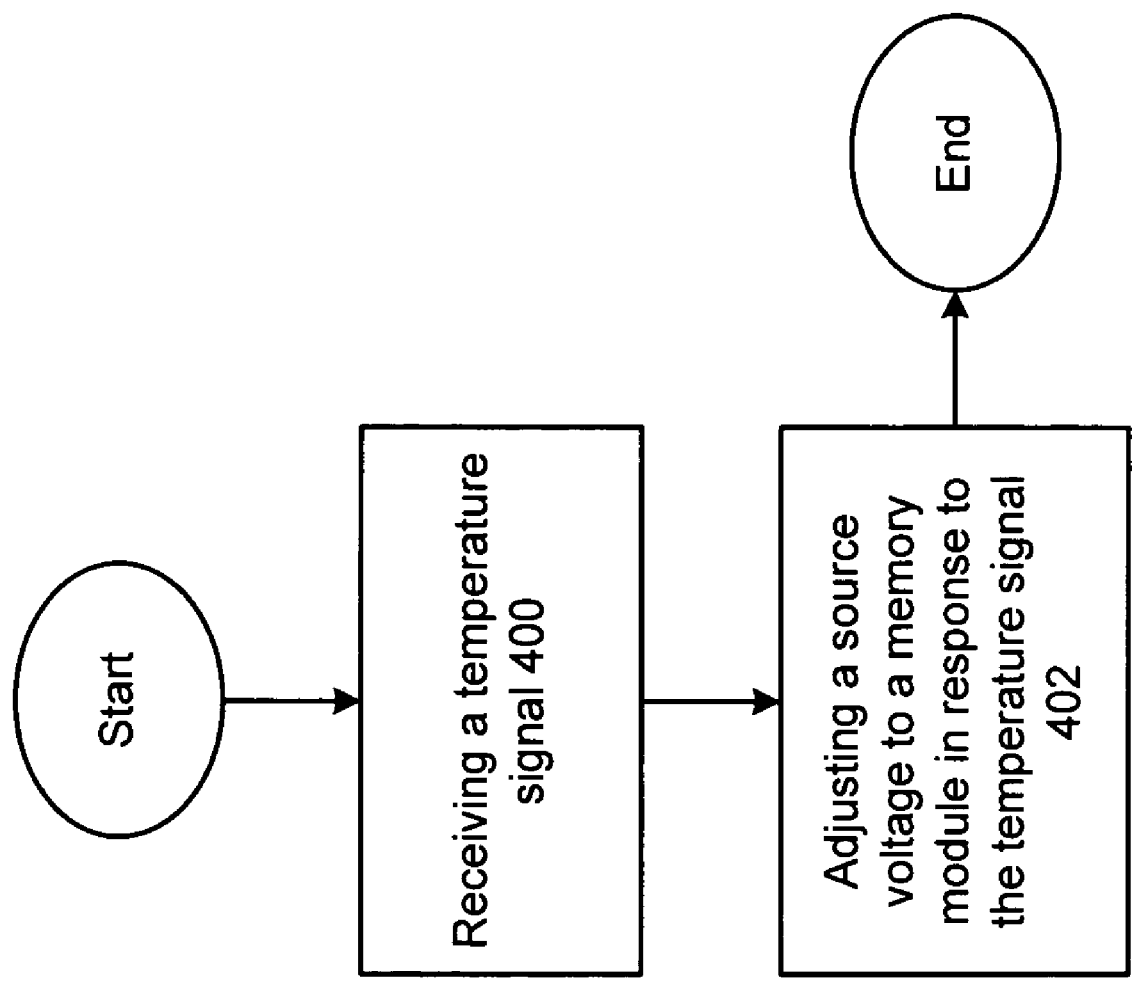

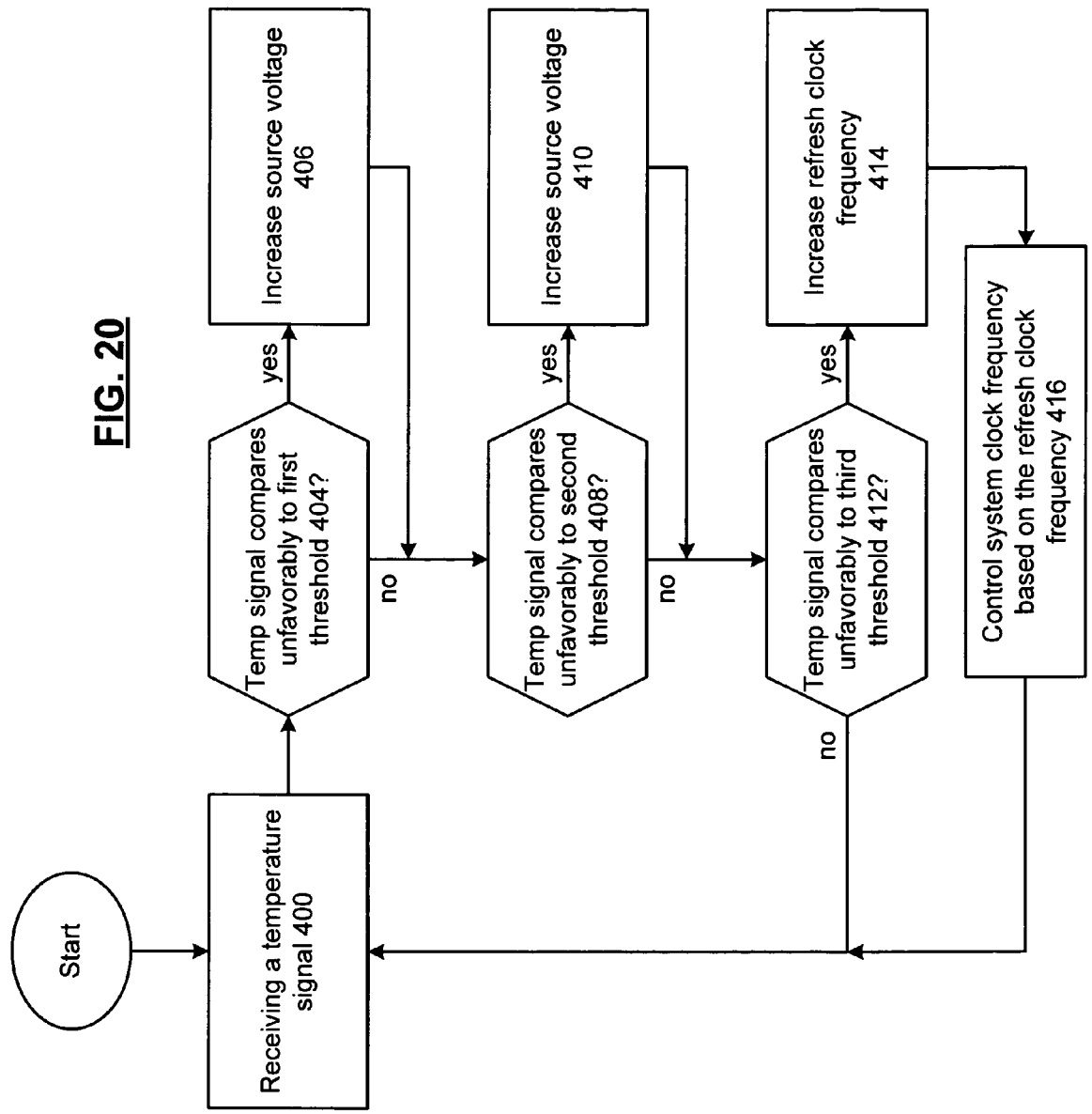

US 7,953,991 B2

PROCESSING SYSTEM AND METHODS FOR USE THEREWITH

CROSS REFERENCE TO RELATED PATENTS

This invention is claiming priority under 35 USC §119(e) to a provisionally filed patent application having the same title as the present patent application, a filing date of Feb. 27, 2006, and an application No. of 60/777,039.

BACKGROUND OF THE INVENTION

1. Technical Field of the Invention

The present invention relates to processing systems that include memory circuits and related methods.

2. Description of Related Art

As is known, integrated circuits are used in a wide variety of electronic equipment, including portable, or handheld, devices. Such handheld devices include personal digital assistants (PDA), CD players, MP3 players, DVD players, AM/FM radios, pagers, cellular telephones, computer memory extensions (commonly referred to as a thumb drive), etc. Each of these handheld devices includes one or more integrated circuits to provide the functionality of the device. As an example, a handheld FM radio receiver may include multiple integrated circuits to support the reception and processing of broadcast radio signals in order to produce an audio output that is delivered to the user through speakers, headphones or the like. Many such integrated circuits include a processing device that executes a program that includes a sequence of instructions that are stored in a memory device such as a random access memory (RAM).

It is desirable for these handheld devices to operate over a range of temperatures that correspond to the various environmental conditions to which the handheld device may be exposed. The need exists for memory devices that operate over a wide range of operating conditions and that can be implemented efficiently in integrated circuit designs.

BRIEF DESCRIPTION OF THE SEVERAL VIEWS OF THE DRAWINGS

FIGS. 17-18 present graphical representations of a function in accordance with embodiments of the present invention.

FIG. 19 presents a flowchart representation of a method in accordance with an embodiment of the present invention.

FIG. 20 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
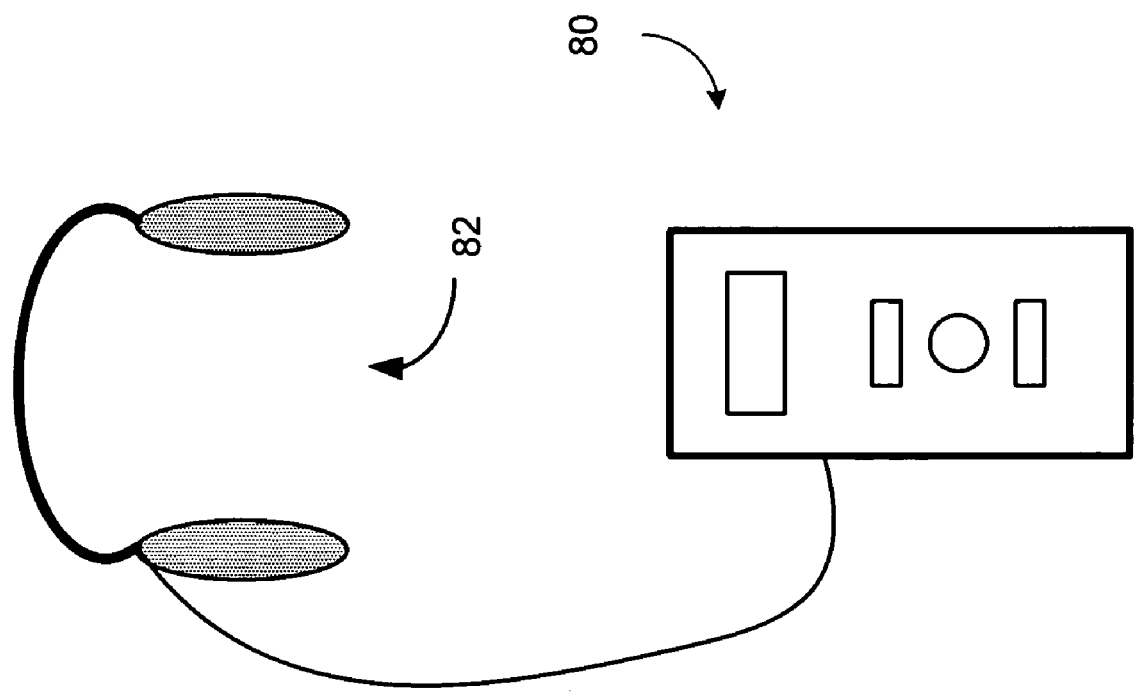
FIG. 1 presents a pictorial diagram of a handheld audio system in accordance with an embodiment of the present invention.

FIG. 1 presents a pictorial diagram of a handheld audio system in accordance with an embodiment of the present invention. In particular, a handheld audio system 80 is shown that receives a radio signal that carries at least one composite audio channel that includes right and left channel stereo audio signals. In operation, the handheld audio system 80 produces an audio output for a user by means of headphones 82 or other speaker systems. In addition to producing an audio output from the received radio signal, the handheld audio system 80 can optionally process stored MP3 files, stored WMA files, and/or other stored digital audio files to produce an audio output for the user. Handheld audio system 80 includes one or more integrated circuits (ICs) that implement the features and functions in accordance with one or more embodiments of the present invention that are discussed herein.

Figure 2:
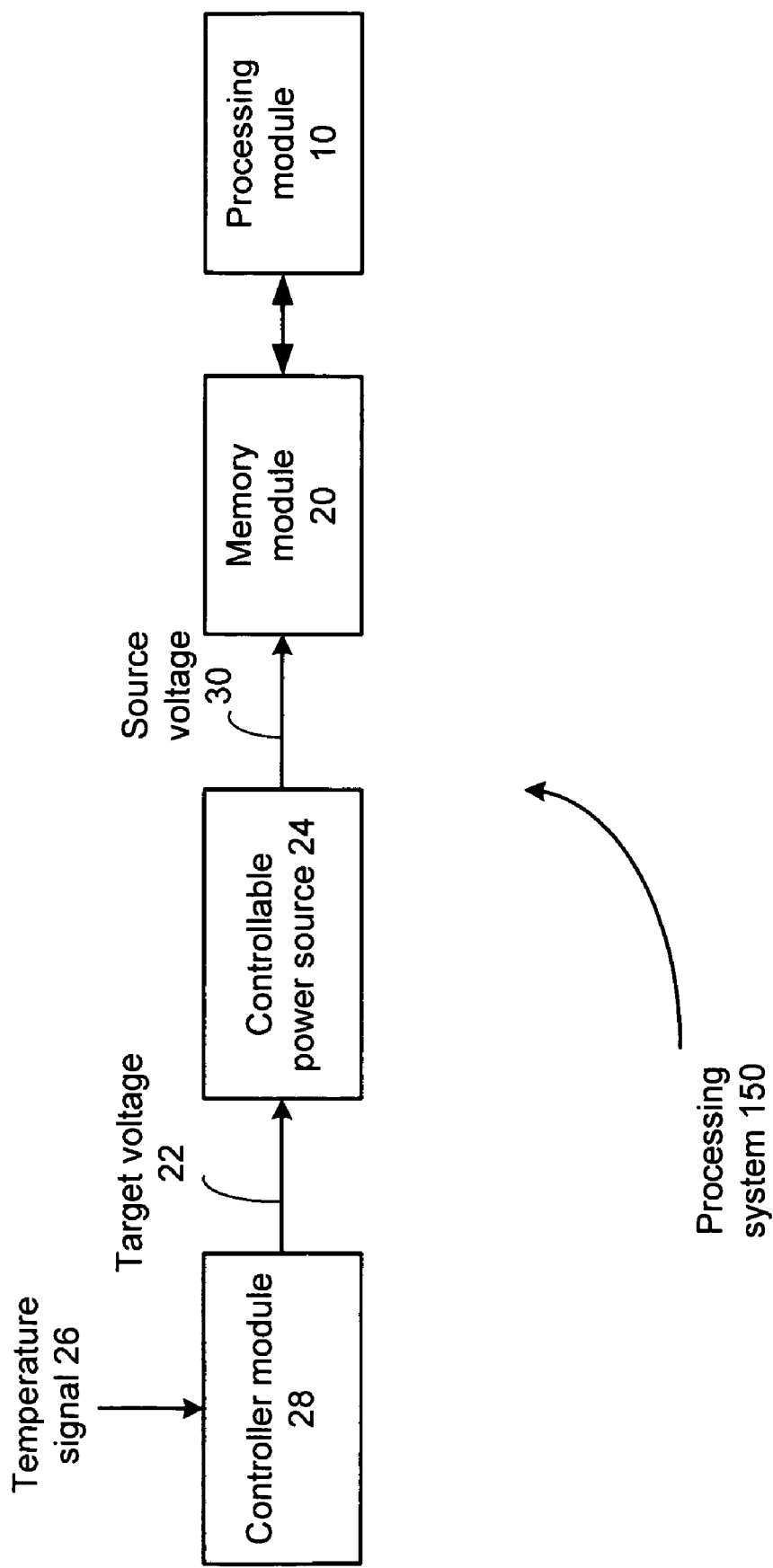
FIG. 2 presents a block diagram representation of a processing system in accordance with an embodiment of the present invention.

FIG. 2 presents a block diagram representation of a processing system in accordance with an embodiment of the present invention. In particular, processing system 150 includes a processing module 10 that is coupled to a memory module 20 for storing a plurality of data. Processing module 10 can be implemented using a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory module 20 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory stores, and the processing module executes, operational instructions that can correspond to one or more of the steps and/or functions illustrated herein.

Processing system 150 further includes a controllable power source 24 for supplying a source voltage 30 to the memory module 20 in response to a target voltage 22. In an embodiment of the present invention, the controllable power source 24 includes a programmable power supply that provides source voltage 30 that is regulated to be substantially equal to the target voltage 22. While source voltage 30 is shown as being supplied to memory module 20, in further embodiments of the present invention, source voltage 30 may likewise provide power to other circuit modules of processing system 150. In the alternative, controllable power source 24 can include one or more other supply voltages, either fixed or variable, that supply power to one or more other circuit modules of processing system 150.

Controller module 28 receives a temperature signal 26 and adjusts the target voltage in response to the temperature signal. In an embodiment of the present invention, temperature signal 26 is produced by a temperature sensor such as a thermistor, resistive temperature sensor, infrared sensor, thermocouple or an integrated circuit temperature sensor. Temperature signal 26 may be a digital signal, analog signal or discrete time signal that is proportional to, or otherwise representative of, the temperature of the memory module 20, of a portion of processing system 150 or of the ambient conditions associated with memory module 20 or processing system 150.

Controller module 28 may be implemented in hardware, firmware or software. In particular, controller module 28 may be a separate processor that implements the functions disclosed herein, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. In an embodiment of the present invention, controller module 28 can be implemented as a series of operational instructions that are executed by processing module 10.

In an embodiment of the present invention, controller module 28 compares the temperature signal 26 to a first temperature threshold, and increases the target voltage 22 by a first function when the temperature signal compares unfavorably to the first temperature threshold, such as during a lower than normal temperature condition. In a further embodiment, controller module 28 compares the temperature signal to a second temperature threshold, and increases the target voltage by a second function when the temperature signal compares unfavorably to the second temperature threshold, such as during a higher than normal temperature condition. The first function and or the second function are selected so as to provide temperature compensation to memory module 20 allowing memory module 20, and therefore processing system 150, to operate over a wider range of temperatures. Further functions, features and alternatives of the invention will be discussed in conjunction with the figures that follow.

Figure 3:
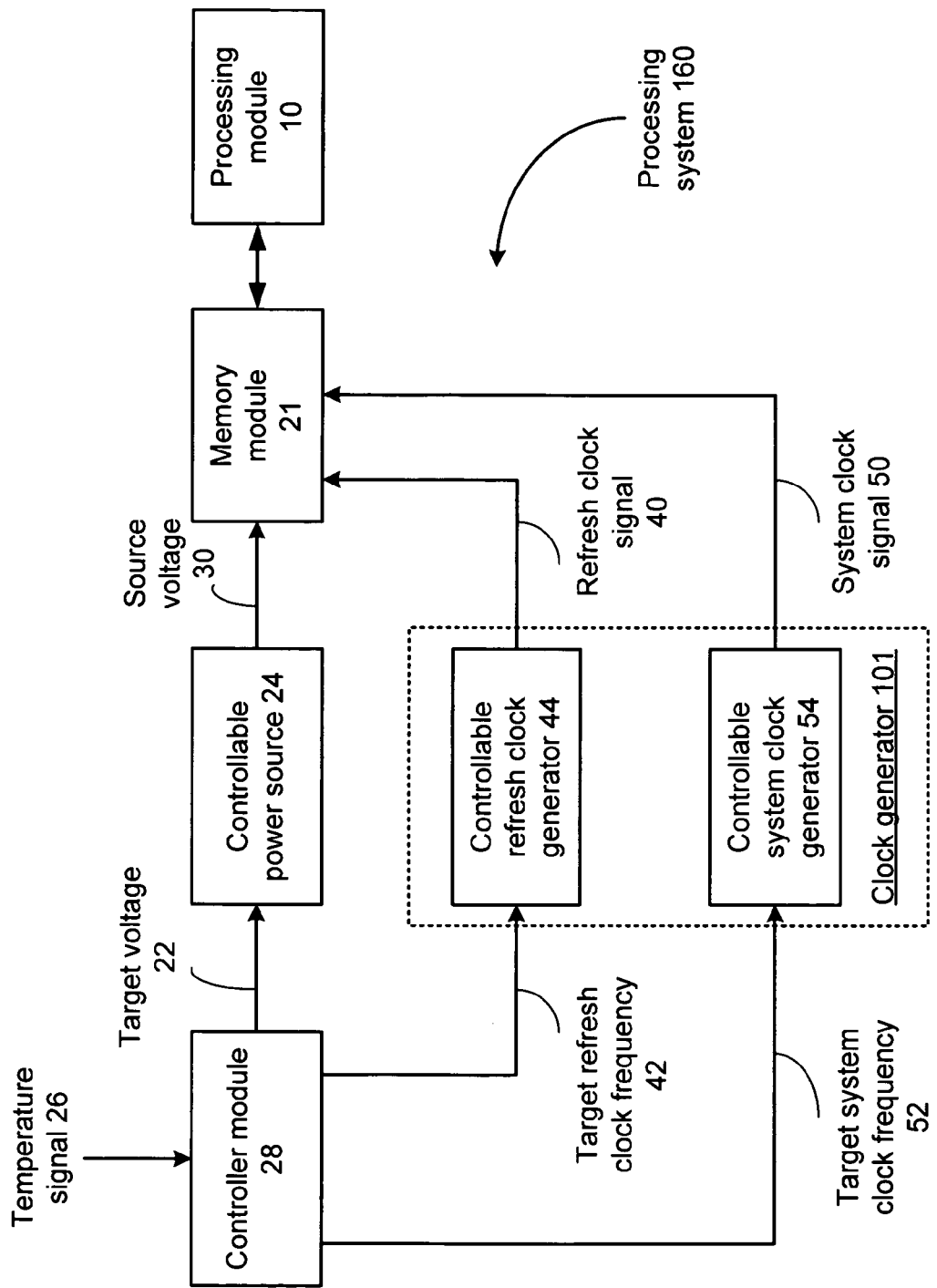
FIG. 3 presents a block diagram representation of a processing system in accordance with an embodiment of the present invention.

FIG. 3 presents a block diagram representation of a processing system in accordance with an embodiment of the present invention. This embodiment of the present invention includes many of the elements of FIG. 2. In this embodiment however, memory module 21 includes an array of DRAM memory cells that are refreshed by refresh circuitry in response to a refresh clock signal 40 from clock generator 101. In addition, memory module 20 is responsive to a system clock signal 50 from clock generator 101 that provides a basis for the timing of internal operations, such as the read/write operations, of the memory module. Memory module 20 can include 1 T DRAM cells, however other circuit configurations such as 2 T, 3 T, 4 T, and 6 T and other circuit designs are likewise possible.

A controllable refresh clock generator 44 is included for supplying a refresh clock signal 40 to the memory module 20. The refresh clock signal 40 has a refresh clock frequency that is based on a target refresh clock frequency 42. In operation, controller module 28 increases the target refresh clock frequency 42 when the temperature signal 26 compares unfavorably to a third temperature threshold, such as during a higher than normal temperature condition.

In addition, a controllable system clock generator 54 supplies the system clock signal 50 to the memory module 20. The system clock signal 50 has a system clock frequency that is based on a target system clock frequency 52. In operation, the controller module controls the system clock frequency in conjunction with the adjustment of the refresh clock frequency. In particular, an increase in the refresh rate consumes more timing overhead of memory module 20. In an embodiment of the present invention, the target system clock frequency is decreased when the temperature signal compares unfavorably to the third temperature threshold, to correspond with the increase in the refresh clock frequency to avoid undesirable effects, such as the overflow of the refresh queue.

The control of the refresh clock frequency and the system clock frequency provide additional temperature compensation for memory module 20, allowing a wider range of operating temperatures.

Figure 4:
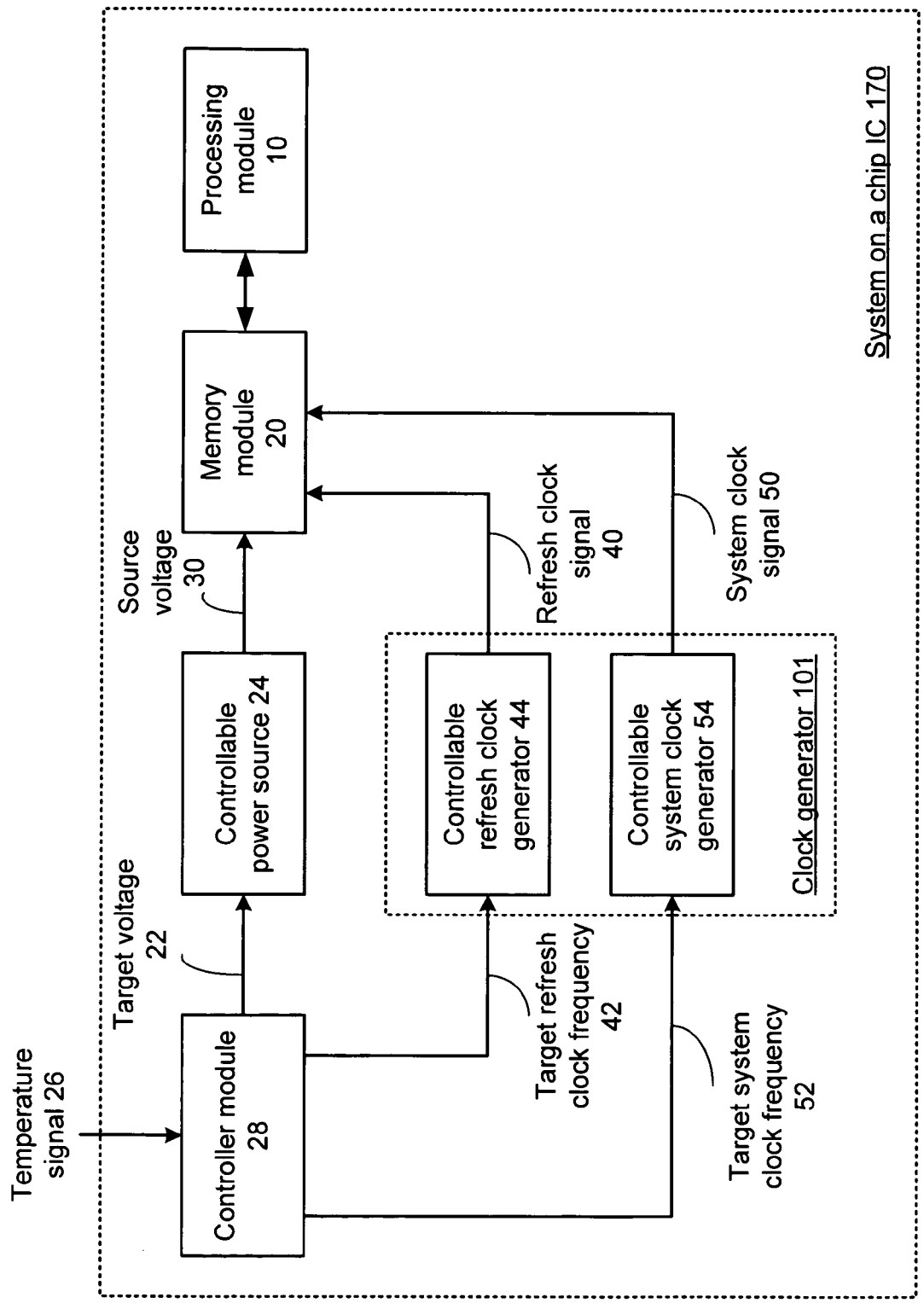
FIG. 4 presents a block diagram representation of a system on a chip integrated circuit in accordance with an embodiment of the present invention.

FIG. 4 presents a block diagram representation of a system on a chip integrated circuit in accordance with an embodiment of the present invention. FIG. 4 presents a system on a chip integrated circuit 170 that includes circuit modules that correspond to the elements of processing system 160. However, other configurations are likewise possible, such that system on a chip integrated circuit 170 includes at least one of: the processing module 10, the memory module 20, the controllable power source 24, the clock generator 101 and the controller module 28. While the embodiment shown includes the temperature signal 26 to be an input to the system on a chip integrated circuit 170, in an alternative embodiment, temperature signal 26 may be generated by an on-board IC temperature sensor.

Figure 5:
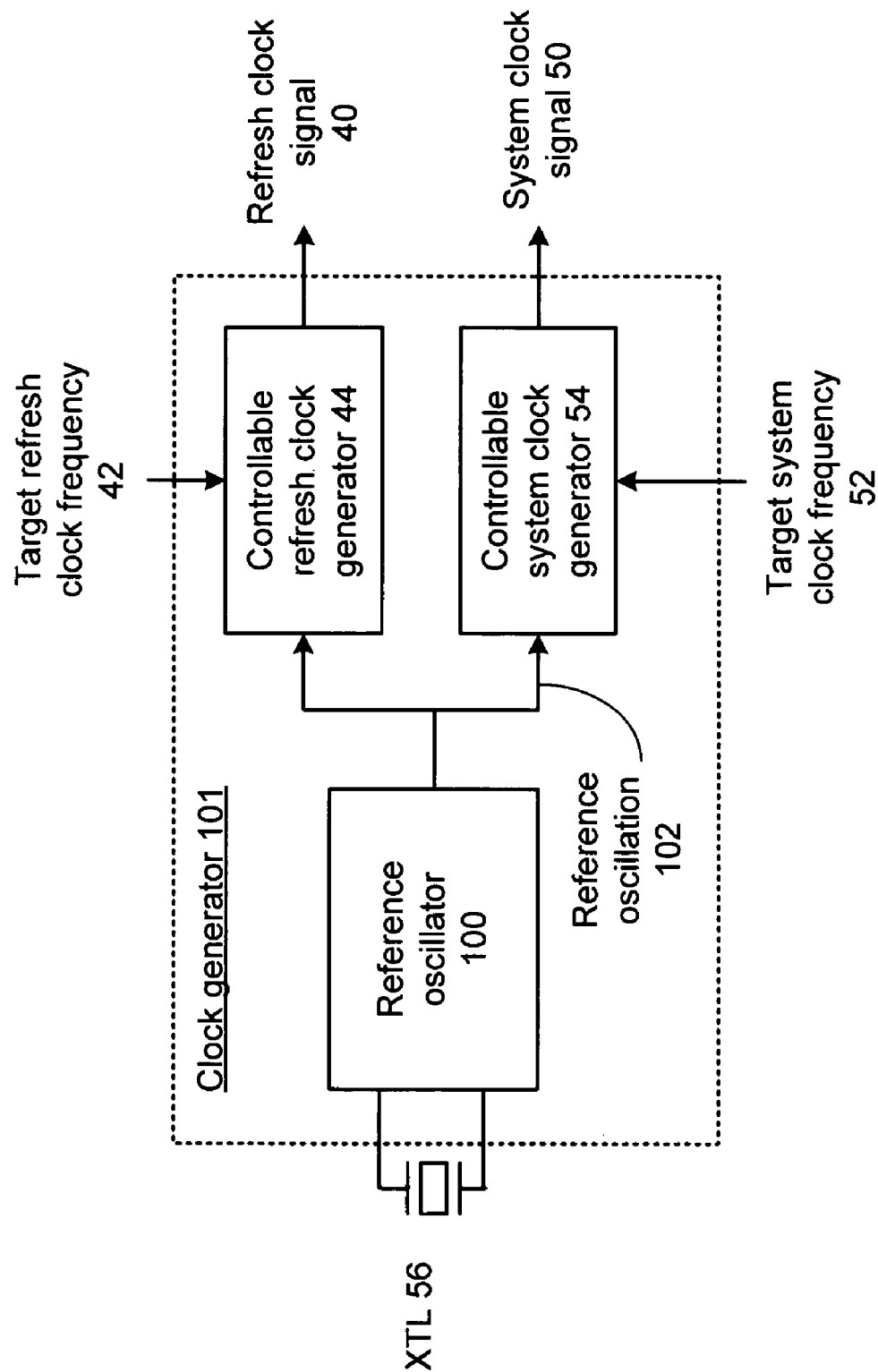
FIG. 5 presents a block/schematic diagram representation of a clock generator in conjunction with an embodiment of the present invention.

FIG. 5 presents a block/schematic diagram representation of a clock generator in conjunction with an embodiment of the present invention. Reference oscillator 100 generates a reference oscillation 102 based on crystal 56. Controllable refresh clock generator 44 and controllable system clock generator 54 produce, respectively, the refresh clock signal 40 and the system clock signal 50, based on the reference oscillation 102 and the target refresh clock frequency 42 and the target system clock frequency 52.

In an embodiment of the present invention, controllable refresh clock generator 44 and controllable system clock generator 54 are implemented with one or more phase-locked loop circuits, programmable frequency dividers, fractional dividers or other circuits such that are capable of producing a clock output at or substantially near a desired frequency.

Figure 7:
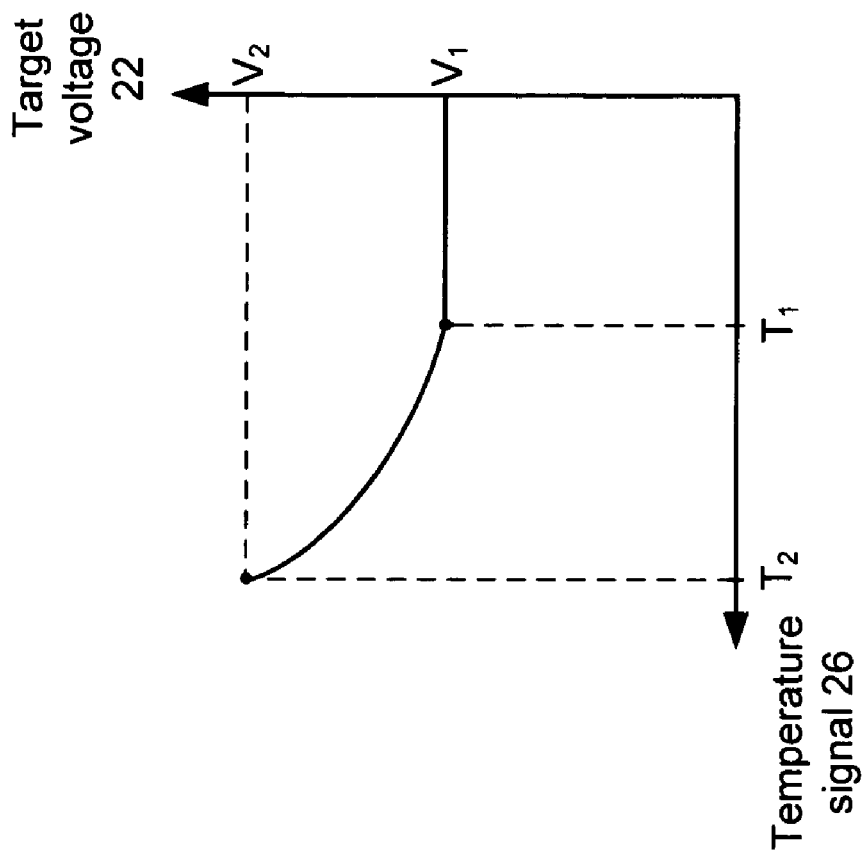
FIGS. 6-7 present graphical representations of a function in accordance with embodiments of the present invention.
Figure 6:
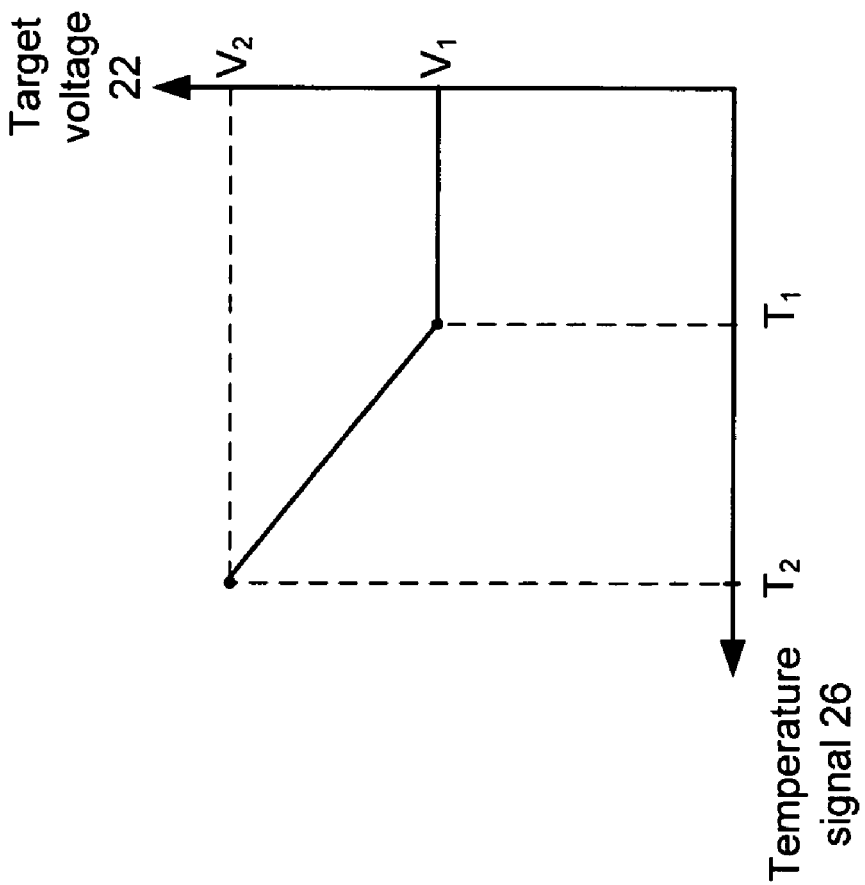

FIGS. 6-7 present graphical representations of a function in accordance with embodiments of the present invention. In particular, FIGS. 6 and 7 present alternative embodiments for a first function used by controller module 28 to calculate a value of target voltage 22 as a function of temperature signal 26. In accordance with an embodiment of the present invention, temperature signal 26 has a value that represents a temperature of memory module 20. As the temperature drops below a first temperature threshold, represented as $T_1$, the target voltage 22 is increased as a function of the difference, from a value of $V_1$, for values immediately above the threshold $T_1$, to a value of $V_2$, when the temperature signal 26 has a value of $T_2$. While shown as a linear function, other functions can likewise be employed, based on the voltage/temperature characteristics of memory module 20. In FIG. 7, the target voltage 22 increases as the temperature drops below the threshold $T_1$, by a first function that is a non-linear function of temperature.

Figure 9:
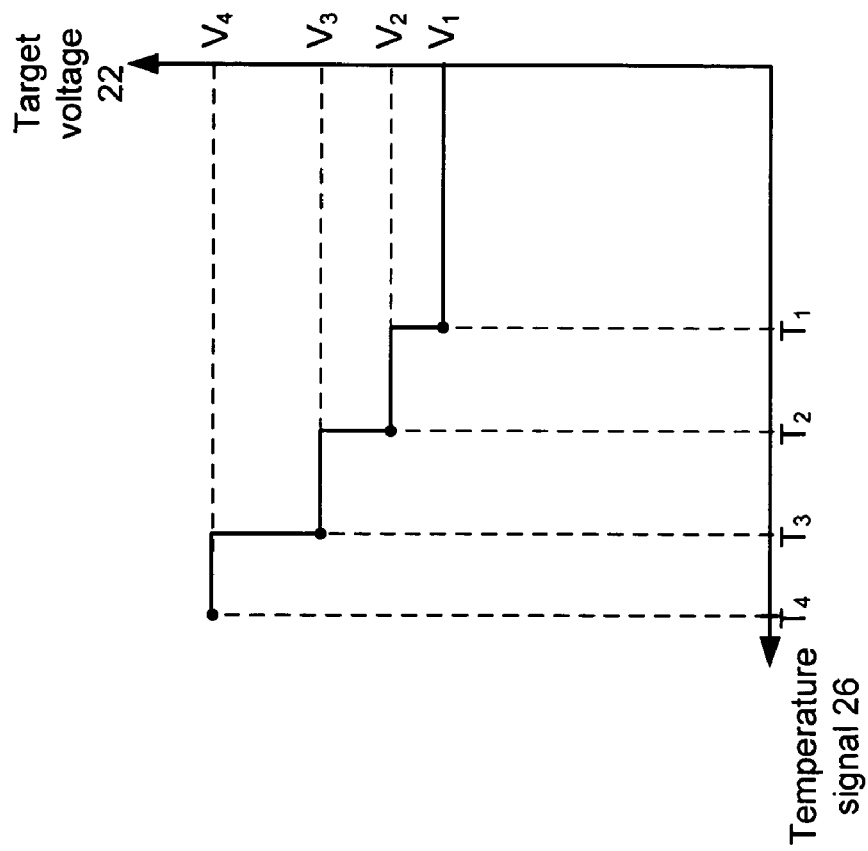
FIGS. 8-9 present graphical representations of a function in accordance with embodiments of the present invention.
Figure 8:
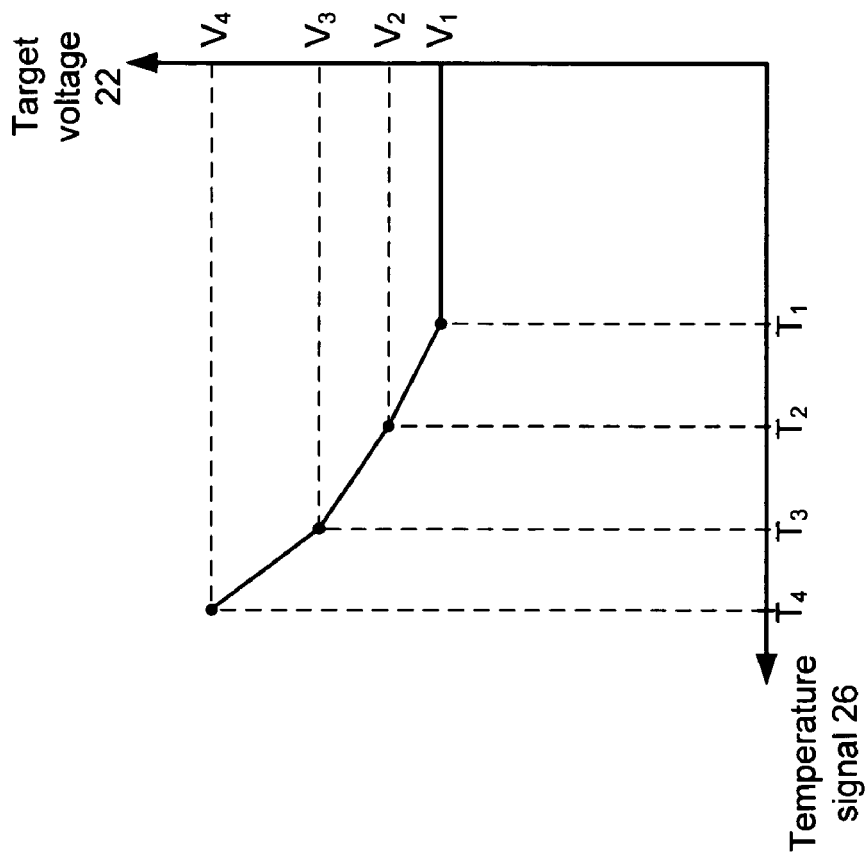

FIGS. 8-9 present graphical representations of a function in accordance with embodiments of the present invention. In particular, FIGS. 8 and 9 present alternative embodiments for a first function used by controller module 28 to calculate a value of target voltage 22 as a function of temperature signal 26. In particular, FIG. 8 presents a piecewise linear function and FIG. 9 presents a compound step function implementation of the first function. Both of these functions lend themselves to an efficient software implementation, because each function can be implemented with conditional statements that employ inequalities and simple arithmetic functions such as (add, subtract, multiply and divide), however, more complex functions can likewise be employed.

While each of the functions presented in FIGS. 6-9 are monotonic functions, that is, the target voltage 22 increases monotonically with a decrease in temperature below the threshold $T_1$, non-monotonic functions can likewise be employed, based on the characteristics of memory module 20.

Figure 11:
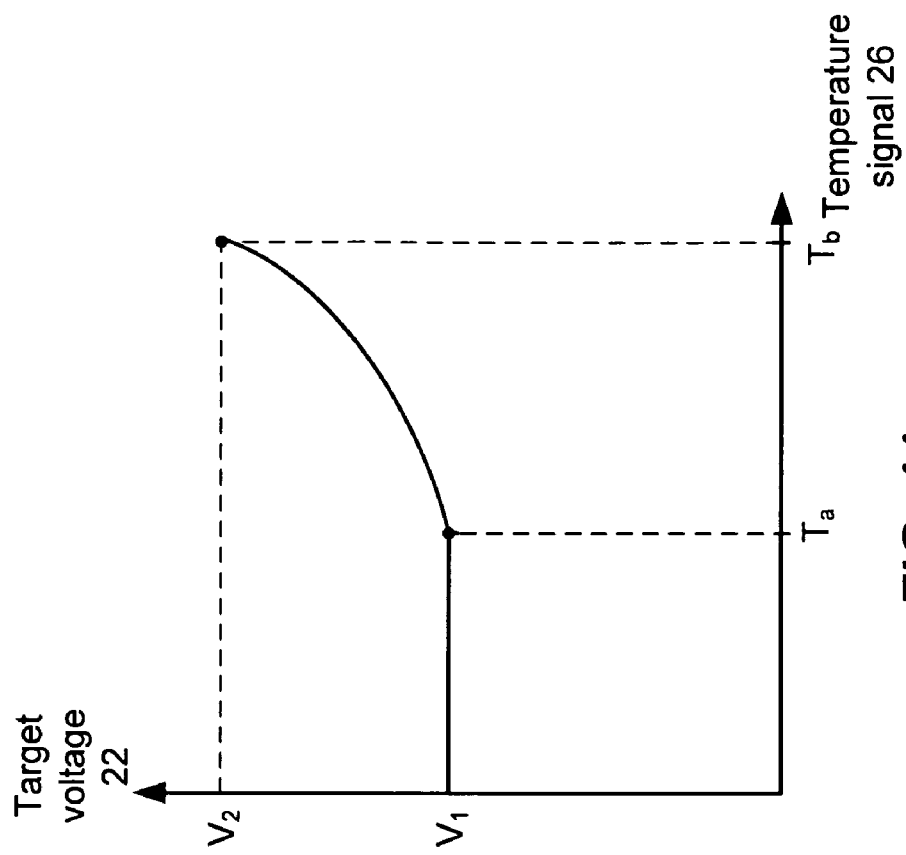
FIGS. 10-11 present graphical representations of a function in accordance with embodiments of the present invention.
Figure 10:
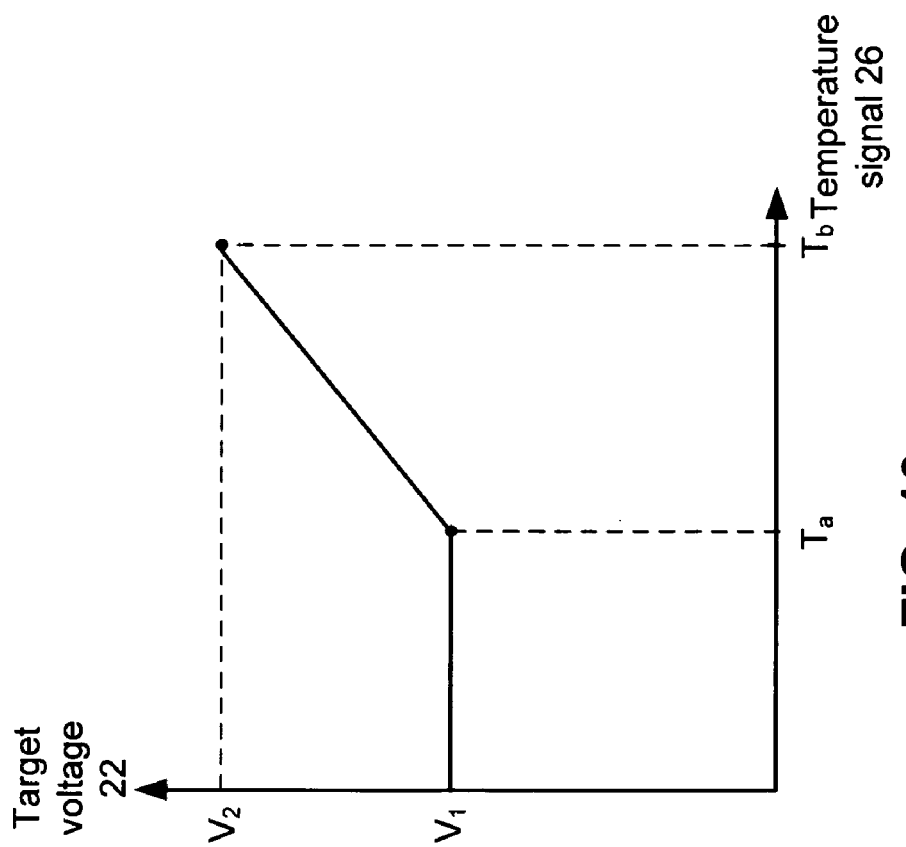

FIGS. 10-11 present graphical representations of a function in accordance with embodiments of the present invention. In particular, FIGS. 10 and 11 present alternative embodiments for a second function used by controller module 28 to calculate a value of target voltage 22 as a function of temperature signal 26. As the temperature increases above a second temperature threshold, represented as $T_a$, the target voltage 22 is increased as a function of the difference, from a value of $V_1$, for values immediately below the threshold $T_a$, to a value of $V_2$, when the temperature signal 26 has a value of $T_b$. While shown as a linear function, other functions can likewise be employed, based on the voltage/temperature characteristics of memory module 20. In FIG. 11, the target voltage 22 increases as the temperature increases above the threshold $T_a$, by a second function that is a non-linear function of temperature.

Figures 12, 13:
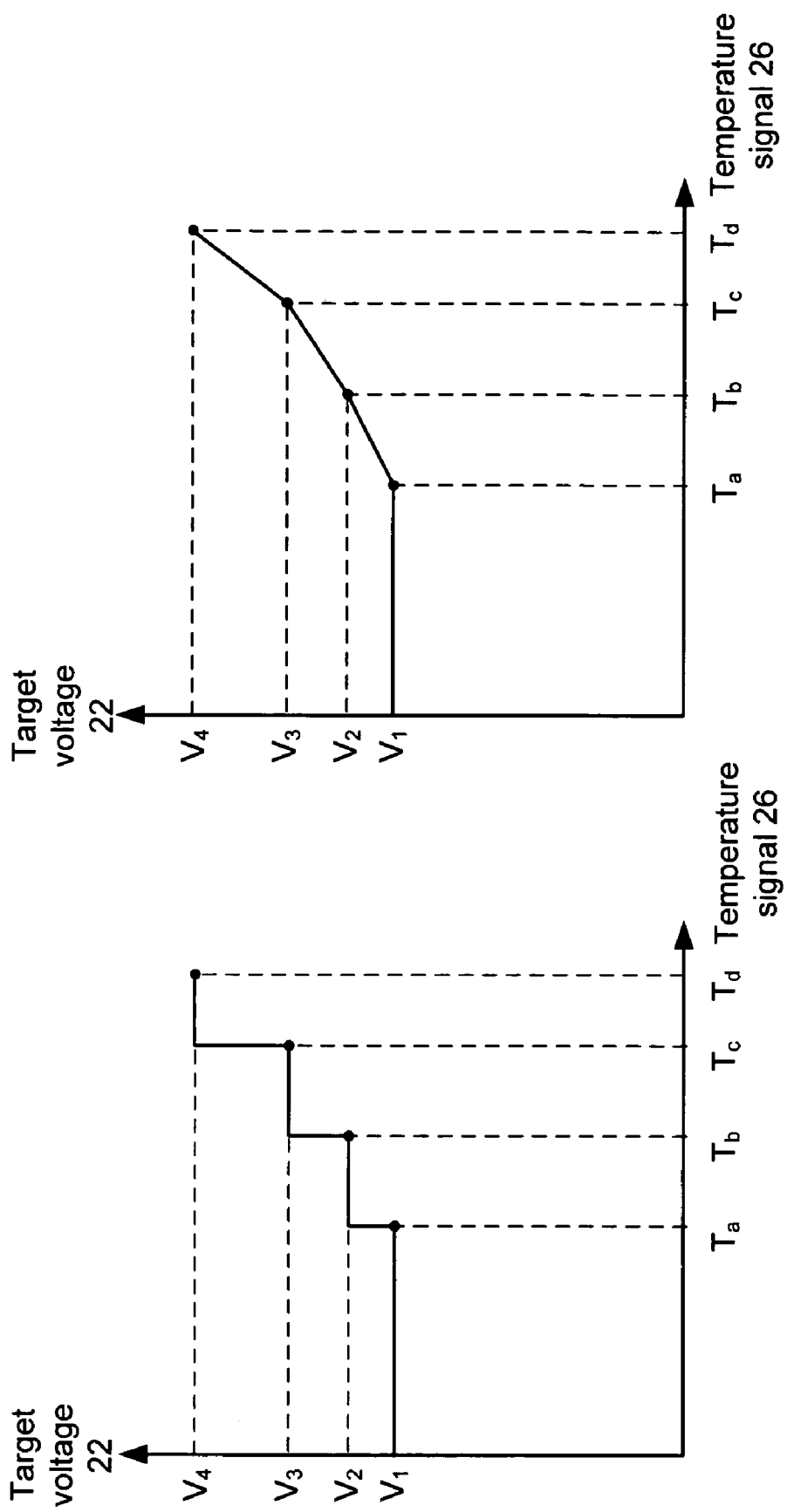
FIGS. 12-13 present graphical representations of a function in accordance with embodiments of the present invention.

FIGS. 12-13 present graphical representations of a function in accordance with an embodiment of the present invention. In particular, FIGS. 12 and 13 present alternative embodiments for a second function used by controller module 28 to calculate a value of target voltage 22 as a function of temperature signal 26. In particular, FIG. 12 presents a piecewise linear function and FIG. 13 presents a compound step function implementation of the second function. Both of these functions lend themselves to an efficient software implementation, because each function can be implemented with conditional statements that employ inequalities and simple arithmetic functions such as (add, subtract, multiply and divide), however, more complex functions can likewise be employed.

While each of the functions presented in FIGS. 10-13 are monotonic functions, that is, the target voltage 22 increases monotonically with an increase in temperature above the threshold $T_a$, non-monotonic functions can likewise be employed, based on the characteristics of memory module 20.

Figure 14:
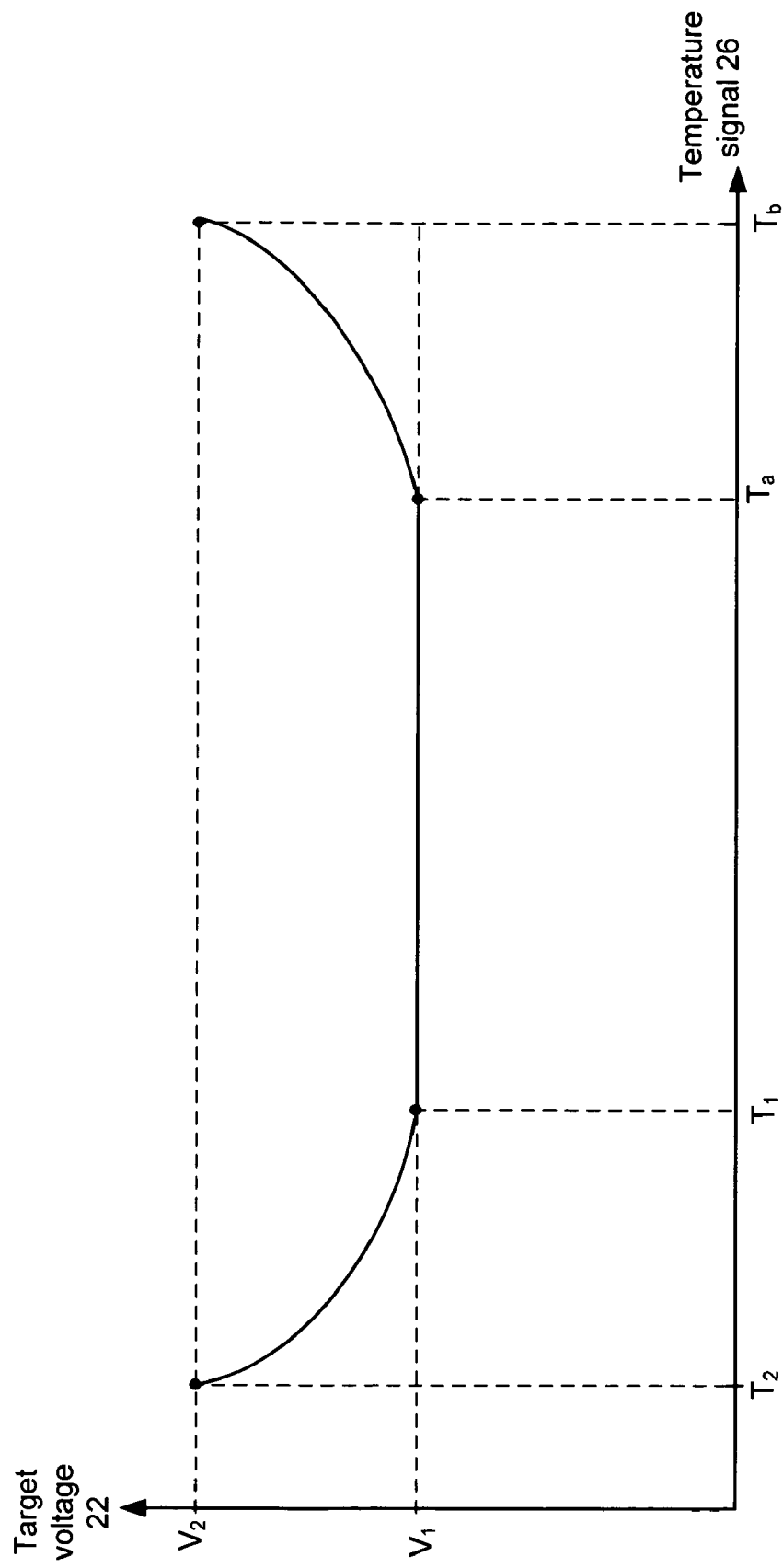
FIG. 14 presents a graphical representation of a function in accordance with embodiments of the present invention.

FIG. 14 presents a graphical representation of a function in accordance with embodiments of the present invention. A function is presented that combines the first and second functions previously described. In operation of memory module 20 in a nominal temperature range between $T_1$ and $T_a$, the target voltage 22 remains at a value of $V_1$. When the operating temperature of the device decreases below the first threshold $T_1$, or increases above the second threshold $T_a$, the target voltage 22 is increased, causing an increase in source voltage 30 to memory module 20.

While a symmetrical function is shown in FIG. 14 as an example, the first function and the second function are not necessarily mirror images of one another and can vary based on the particular characteristics of memory module 20.

Figure 16:
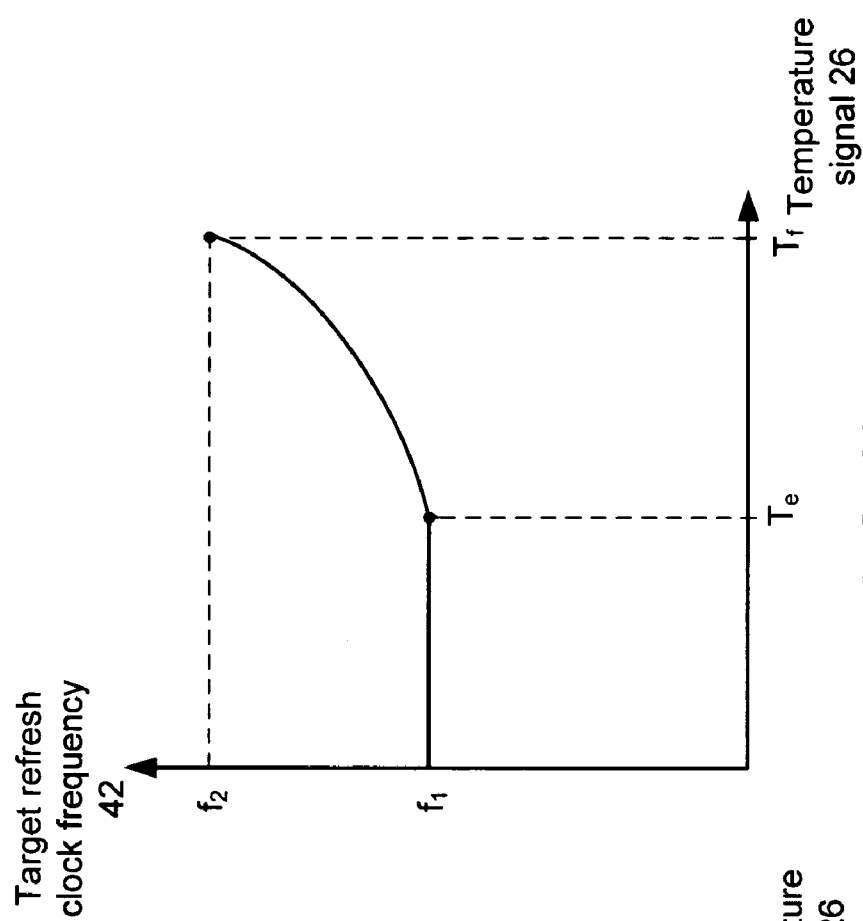
FIGS. 15-16 present graphical representations of a function in accordance with embodiments of the present invention.
Figure 15:
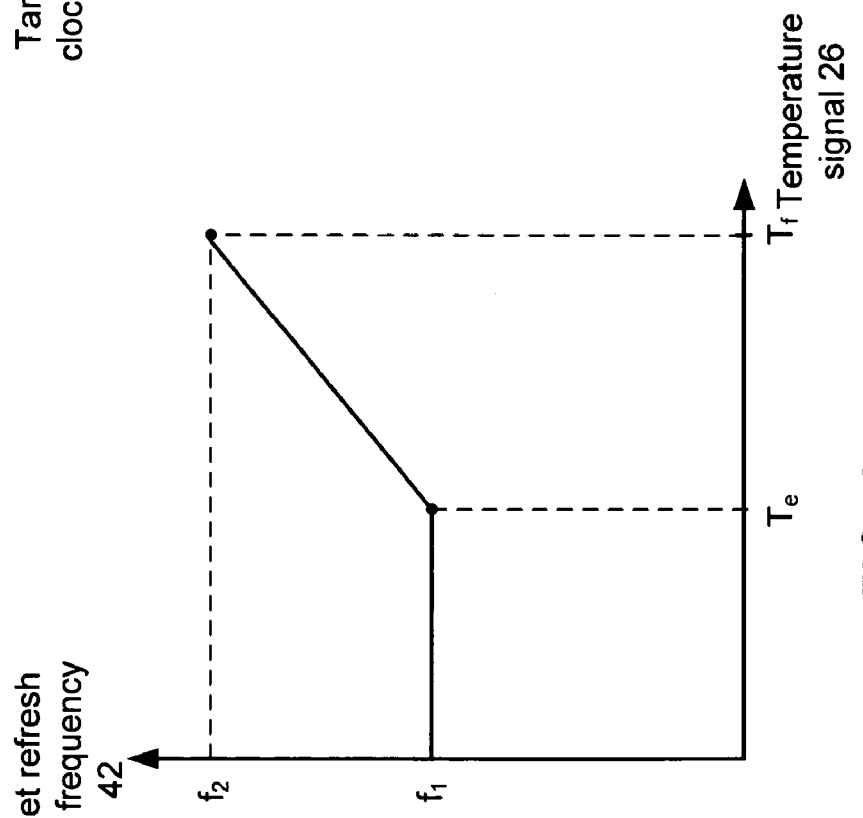

FIGS. 15-16 present graphical representations of a function in accordance with embodiments of the present invention. In particular, FIGS. 15 and 16 present alternative embodiments used by controller module 28 to calculate a value of target refresh clock frequency 42 as a function of temperature signal 26. As the temperature increases above a third temperature threshold, represented as $T_e$, the target refresh clock frequency 42 is increased as a function of the difference, from a value of $f_1$, for values immediately below the threshold $T_e$, to a value of $f_2$, when the temperature signal 26 has a value of $T_f$. While shown as a linear function, other functions can likewise be employed, based on the voltage/temperature characteristics of memory module 20. In FIG. 15, the target refresh clock frequency 42 increases as the temperature increases above the threshold $T_e$, by a function that is a non-linear function of temperature.

FIGS. 17-18 present graphical representations of a function in accordance with embodiments of the present invention. In particular, FIGS. 17 and 18 present alternative embodiments used by controller module 28 to calculate a value of for a target refresh clock frequency as a function of temperature signal 26. In particular, FIG. 17 presents a piecewise linear function and FIG. 18 presents a compound step function implementation of the second function. Both of these functions lend themselves to an efficient software implementation, because each function can be implemented with conditional statements that employ inequalities and simple arithmetic functions such as (add, subtract, multiply and divide), however, more complex functions can likewise be employed.

While each of the functions presented in FIGS. 15-18 are monotonic functions, that is, the target refresh clock frequency 42 increases monotonically with an increase in temperature above the threshold $T_e$, non-monotonic functions can likewise be employed, based on the characteristics of memory module 20. While the second and third temperature thresholds $T_a$ and $T_e$, have been represented separately, in an embodiment of the present invention $T_a$ and $T_e$ are equal or substantially equal to one another.

FIG. 19 presents a flowchart representation of a method in accordance with an embodiment of the present invention. In particular, a method is presented for use with some or all of the features and functions described in conjunction with FIGS. 1-18. The method begins in step 400 by receiving a temperature signal. In step 402, a source voltage to a memory module is adjusted in response to the temperature signal.

FIG. 20 presents a flowchart representation of a method in accordance with an embodiment of the present invention. In particular, a method is presented for use with some or all of the features and functions described in conjunction with FIGS. 1-19. The method begins in step 400 by receiving a temperature signal. In step 404 the temperature signal is compared to a first temperature threshold. In step 406 the source voltage is increased when the temperature signal compares unfavorably to the first temperature threshold. In step 408, the temperature signal is compared to a second temperature threshold. In step 410 the source voltage is increased when the temperature signal compares unfavorably to the second temperature threshold. In step 412, the temperature signal is compared to a third temperature threshold. In step 414 a refresh clock frequency is increased when the temperature signal compares unfavorably to a third temperature threshold. In step 416 a system clock frequency is controlled based on the refresh clock frequency when the temperature signal compares unfavorably to the third temperature threshold. In an embodiment of the present invention, the system clock frequency is decreased when the temperature signal compares favorably to the third temperature threshold.

In an embodiment of the present invention, the temperature of a memory device such as memory module 20 is periodically monitored and the source voltage is increased at either high or low extreme temperatures, and the refresh clock frequency is increased at high temperatures and the system clock frequency is controlled to compensate for the increased refresh clock frequency.

Figure 22:
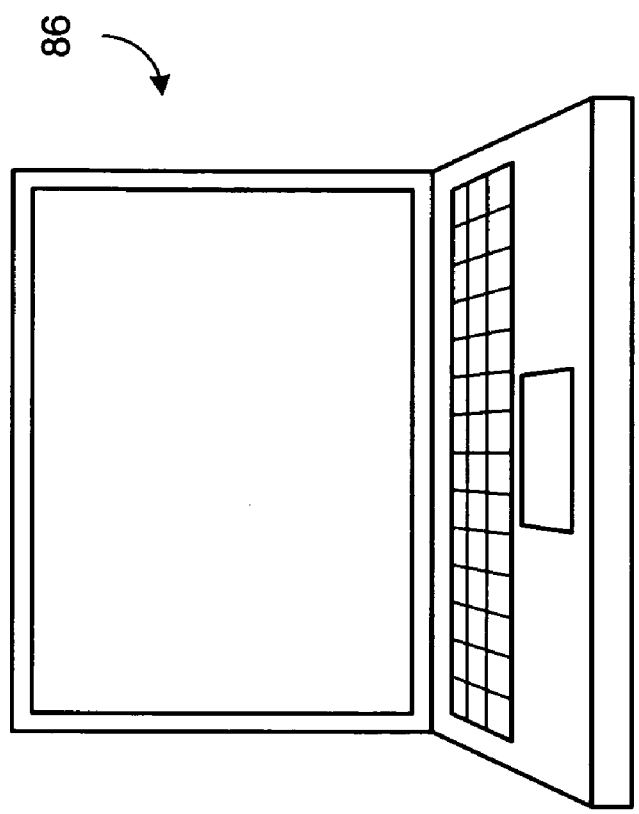
FIGS. 21-22 present pictorial diagrams of other devices in accordance with an embodiment of the present invention.
Figure 21:
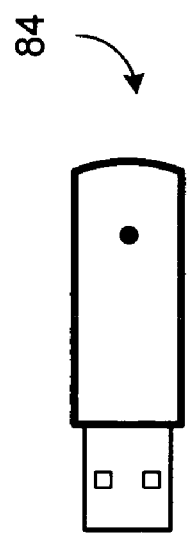

FIGS. 21-22 present pictorial diagrams of other devices in accordance with an embodiment of the present invention. While the preceding disclosure has been directed to handheld audio system 80, processing systems 150, 160 and system on a chip integrated circuit 170 can be used in a wide variety of electronic devices such as in a universal service bus (USB) device 84, in a computer 86, or in a variety of other electronic devices that employ processing systems, system on a chip integrated circuits, or memory devices.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The various circuit components can be implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a memory and a processing system. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A system on a chip integrated circuit comprising:
   a processing module;
   a memory module, operably coupled to the processing module, for storing a plurality of data;
   a controllable power source, operably coupled to the memory module, for supplying a source voltage to the memory module in response to a target voltage; and
   a controller module, operably coupled to the memory module and the controllable power source, for receiving a temperature signal and further operable to:
      compare the temperature signal to a first temperature threshold;
      increase the target voltage as a first function of the difference between the temperature signal and the first temperature threshold, when the temperature signal indicates that a temperature of the memory module is below the first temperature threshold;
      compare the temperature signal to a second temperature threshold;
      increase the target voltage as a second function of the difference between the temperature signal and the second temperature threshold, when the temperature signal indicates that the temperature of the memory module is above the second temperature threshold, wherein the second temperature threshold is greater than the first temperature threshold; and
      when the temperature signal indicates that the temperature of the memory module is between the first and second temperature thresholds, maintain the target voltage at a current level.

2. The system on a chip integrated circuit of claim 1 further comprising: a controllable refresh clock generator for supplying a refresh clock signal to the memory module, the refresh clock signal having a refresh clock frequency that is based on a target refresh clock frequency; wherein the controller module increases the target refresh clock frequency when the temperature signal compares unfavorably to the second temperature threshold.

3. The system on a chip integrated circuit of claim 1 further comprising:
   a controllable system clock generator for supplying a system clock signal to the memory module, the system clock signal having a system clock frequency that is based on a target system clock frequency;
   wherein the controller module increases the target system clock frequency when the temperature signal compares unfavorably to the second temperature threshold.

4. The system on a chip integrated circuit of claim 3 wherein the controller module decreases the system clock frequency when the temperature signal compares unfavorably to the second temperature threshold.

5. The system on a chip integrated circuit of claim 1 wherein at the first function is a monotonically decreasing function, and the second function is a monotonically increasing function.

6. A processing system comprising:
a processing module;
a memory module, operably coupled to the processor, for storing plurality of data;
a controllable power source, operably coupled to the memory module, for supplying a source voltage to the memory module in response to a target voltage; and
a controller module, operably coupled to the memory module and the controllable power source, for receiving a temperature signal, comparing the temperature signal to a first temperature threshold and to a second temperature threshold that is greater than the first temperature threshold, for increasing the target voltage when the temperature signal indicates that a temperature of the memory module is below the first temperature threshold or is above the second temperature threshold, and for maintaining the target voltage at a current level when the temperature signal indicates that the temperature of the memory module is between the first and second temperature thresholds.

7. The processing system of claim 6, wherein the controller module increases the target voltage as a first function of the difference between the temperature signal and the first temperature threshold.

8. The processing system of claim 6, wherein the controller module increases the target voltage as a second function of the difference between the temperature signal and the second temperature threshold.

9. The processing system of claim 6, further comprising:
a controllable refresh clock generator for supplying a refresh clock signal to the memory module, the refresh clock signal having a refresh clock frequency that is based on a target refresh clock frequency;
wherein the controller module increases the target refresh clock frequency when the temperature signal compares unfavorably to a third temperature threshold.

10. The processing system of claim 9 further comprising:
a controllable system clock generator for supplying a system clock signal to the memory module, the system clock signal having a system clock frequency that is based on a target system clock frequency;
wherein the controller module decreases the target system clock frequency when the temperature signal compares unfavorably to the third temperature threshold.

11. The processing system of claim 9 wherein the third temperature threshold is equal to the second temperature threshold.

12. The processing system of claim 6 wherein at least one of: the processing module, the memory module, the controllable power source and the controller module, are implemented on a system on a chip integrated circuit.

13. A method comprising:
receiving a temperature signal;
making a first comparison between the temperature signal and a first temperature threshold;
making a second comparison between the temperature signal and a second temperature threshold that is greater than the first temperature threshold;
adjusting a source voltage to a memory module in response to the first comparison and the second comparison, by increasing the source voltage when the temperature signal indicates that a temperature is either below the first temperature threshold or above the second temperature threshold; and
maintaining the source voltage at a current level when the temperature signal indicates that the temperature of the memory module is between the first and second temperature thresholds.

14. The method of claim 13, wherein the step of increasing the source voltage includes increasing the source voltage as a first function of a difference between the temperature signal and the first temperature threshold.

15. The method of claim 14 wherein the first function is a monotonic function.

16. The method of claim 13, wherein the step of increasing the source voltage includes increasing the source voltage as a second function of a difference between the temperature signal and the second temperature threshold.

17. The method of claim 16 wherein the second function is a monotonic function.

18. The method of claim 13, further comprising the step of:
increasing a refresh clock frequency when the temperature signal compares unfavorably to a third temperature threshold.

19. The method of claim 18 further comprising the step of:
controlling a system clock frequency based on the refresh clock frequency when the temperature signal compares unfavorably to the third temperature threshold.

20. The method of claim 19 wherein the step of controlling a system clock frequency includes decreasing the system clock frequency when the temperature signal compares unfavorably to the third temperature threshold.

21. The method of claim 18 wherein the third temperature threshold is equal to the second temperature threshold.

22. The system on a chip integrated circuit of claim 1, wherein the first function and the second function are linear functions.

23. The system on a chip integrated circuit of claim 1, wherein the first function and the second function are non-linear functions.

24. The system on a chip integrated circuit of claim 1, wherein the first function and the second function are symmetrical functions.

* * * * *